Jan. 17, 1961 C. H. COWLEY ET AL 2,968,125
APPARATUS FOR PRODUCING A MULTIPLE SHEET GLAZING UNIT
Filed April 12, 1955 2 Sheets-Sheet 1

INVENTORS
Charles H. Cowley, Harry N. Dean
BY and Edwin C. Montgomery
Nobbe & Swope
ATTORNEYS Jan. 17, 1961   C. H. COWLEY ET AL   2,968,125
APPARATUS FOR PRODUCING A MULTIPLE SHEET GLAZING UNIT
Filed April 12, 1955   2 Sheets-Sheet 2

INVENTORS
Charles H. Cowley, Harry N. Dean
BY and Eldwin C. Montgomery
Nobbe & Swope
ATTORNEYS

# United States Patent Office 2,968,125
Patented Jan. 17, 1961

2,968,125

APPARATUS FOR PRODUCING A MULTIPLE SHEET GLAZING UNIT

Charles H. Cowley, Toledo, Harry N. Dean, Waterville, and Eldwin C. Montgomery, Toledo, Ohio, assignors to Libbey-Owens-Ford Glass Company, Toledo, Ohio, a corporation of Ohio Filed Apr. 12, 1955, Ser. No. 500,877

3 Claims. (Cl. 49—1)

This invention relates broadly to all-glass, multiple sheet glazing units and more particularly to an apparatus for forming dehydration or breather holes in such multiple sheet glazing units.

Multiple sheet glazing units may be described generally as comprising two or more sheets of glass which are sealed entirely around their edge portions in spaced relation to provide a hermetically sealed dead air space therebetween. Due principally to their insulating and condensation preventing qualities, such units have become well established in the building trades and have found wide usage as windows for buildings, show cases, vehicles, refrigerators, and the like.

In order to provide a multiple sheet glazing unit with the desired heat insulating and condensation preventing qualities, it is necessary that humid or moisture laden air be removed from the space between the sheets of glass making up the unit. This may be done by partial evacuation or by replacing the moisture laden air with dry air or gas which is best suited to the conditions to which the unit is to be put. To make possible the removal of moisture laden air from the enclosed space between the glass sheets, with or without substituting dry air or gas therefor after the sheets have been joined at the marginal edges to enclose the space, a means of access to the space must be provided in the hermetically sealed unit. Likewise, after the space has been properly dehydrated the means of access must be permanently sealed to again hermetically seal the unit.

The conventional way of providing access to the enclosed space between the sheets of glazing units of this character, is to drill or otherwise cut an opening through one of the sheets before they are sealed together so that the internal and external pressures may also be equalized while the edge portions of the sheets are being fused together. However, drilled holes of this type have several disadvantages in that the glass often times breaks when drilled, or small fissures are produced around the hole in drilling which cause the sheet to break when exposed to thermal shock. Additionally, when the holes are drilled through the face surfaces of the glass sheets, the sealed hole is, in many cases, exposed after the unit has been glazed leaving it vulnerable to sharp instruments such as a glazer's putty knife, etc.

It is therefore a primary object of this invention to provide an all-glass multiple sheet glazing unit in which a dehydration hole or breather hole is provided along the sealed edge wall of the unit.

Another object of the invention is to provide a relatively simple, inexpensive means for forming dehydration or breather holes in all-glass multiple sheet glazing units.

Another object of the invention is to provide an apparatus for forming dehydration or breather holes in the sealed edge portions of all-glass multiple sheet glazing units during the sealing of the sheets together.

A further object of the invention is to provide an apparatus for forming dehydration or breather holes in the edge portions of all-glass multiple sheet glazing units while the sheets are being moved relative to a heat source to fuse them together.

A still further object of the invention is to provide an all-glass multiple sheet glazing unit which is neat in appearance and safer from the standpoint of installation having a dehydration hole formed in the sealed edge thereof.

Other objects and advantages of the invention will become more apparent during the course of the following description when taken in connection with the accompanying drawings.

In the drawings, wherein like numerals are employed to designate like parts throughout the same:

While the present invention is not necessarily limited to the formation of dehydration or breather holes in multiple sheet glazing units in conjunction with any particular fabricating apparatus or according to any particular method, it has particular utility when used with the apparatus for forming multiple sheet glazing units described in copending application Serial No. 464,012, filed October 22, 1954, now abandoned, in the names of Eldwin C. Montgomery, Harry N. Dean, Eugene W. Babcock, and Donald E. Sharp and will be described in that connection here.

Figure 1:
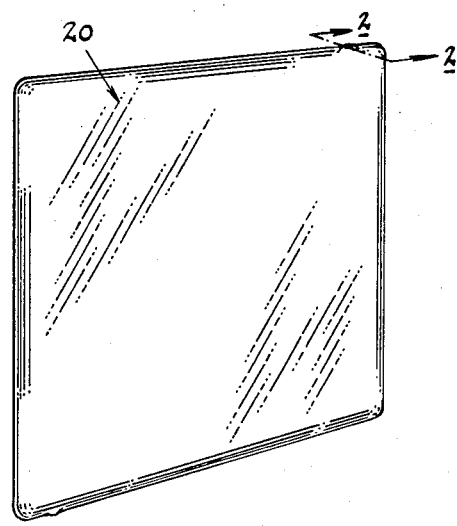
Fig. 1 is a perspective view of an all-glass multiple sheet glazing unit of the type with which this invention is concerned.
Figure 2:
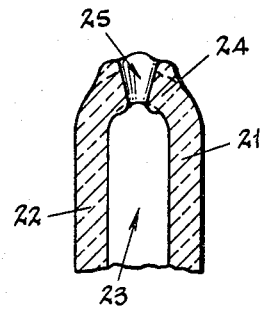
Fig. 2 is a sectional view of the glazing unit taken substantially along lines 2—2 of Fig. 1 showing a dehydration or breather hole in the sealed edge wall of the unit.

With reference now to the drawings, there is shown in Figs. 1 and 2 an all-glass glazing unit 20 produced in accordance with this invention which comprises two sheets of glass 21 and 22 spaced from one another as at 23 by edge wall portions 24. As shown in Fig. 2 a dehydration or breather hole 25 to which this invention is concerned is disposed in at least one of the edge wall portions 24. It is through dehydration or breather holes of this type that pressures within the space 23 are equalized with respect to the external pressure on the outside of the unit during and after the sheets are fused together. Also, it is through the dehydration hole that the dehydrated air is introduced into the unit.

Figure 4:
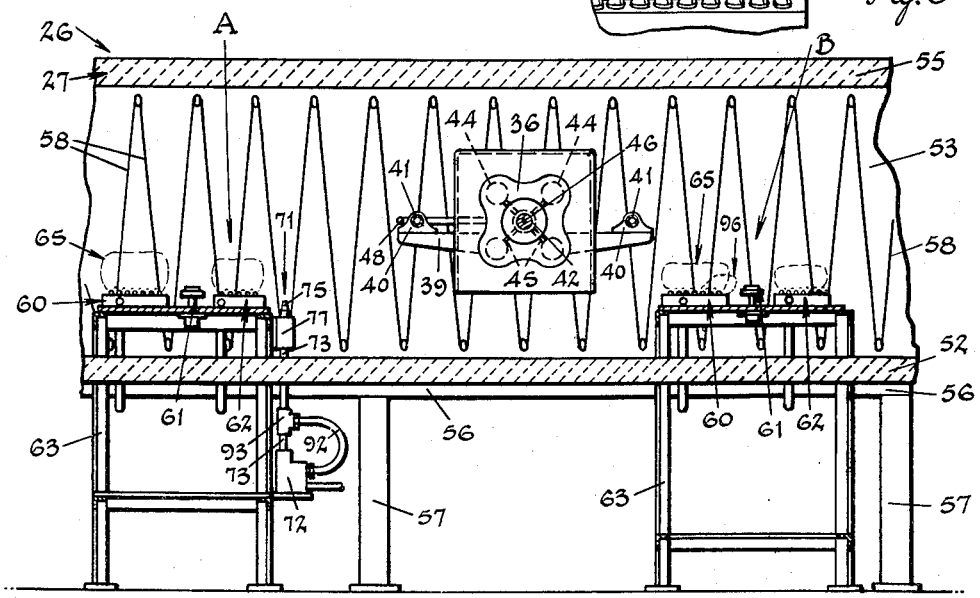
Fig. 4 is a fragmentary sectional view of apparatus for producing an all-glass glazing unit according to this invention.
Figure 6:
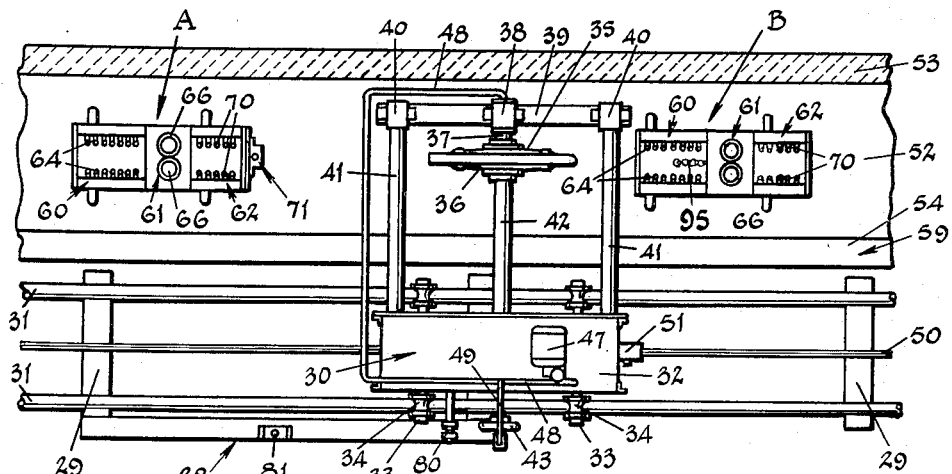
Fig. 6 is a fragmentary sectional plan view of the apparatus showing the conveyor apparatus in relation to the fusing burners and hole forming means.

As will best be seen in Figs. 4 and 6, the means by which the all-glass multiple sheet glazing unit 20 may be produced is designated generally by the numeral 26 and includes a furnace 27, and a conveyor means 28 mounted adjacent the furnace for carrying the sheets through the furnace to be fused. Within the furnace there are arranged a plurality of sealing areas here designated by the letters A and B respectively through which sheets 21 and 22 pass during the sealing process.

The conveyor 28 includes a rail support frame 29 and a carriage 30 adapted to ride on rails 31 mounted on the support frame. The carriage 30 which is adapted to move the spaced sheets 21 and 22 through the furnace, includes a substantially rectangular base 32 (Fig. 6) supported on axles 33 which carry groove wheels 34 at their ends cut to substantially the curvature of the rails 31 so as to accurately guide the carriage as it moves adjacent the furnace.

Vacuum platens 35 and 36 are provided on the carriage to support the sheets 21 and 22 in substantially vertical and spaced position with respect to one another as the carriage moves the sheets through the furnace. More particularly, the vacuum platen 35 is mounted on one end of a stub shaft 37 which is rotatably mounted adjacent its other end in a bearing 38 on a cross arm 39. Cross arm 39 is supported by means of pillow blocks 40 between the ends of a pair of spaced support rods 41 which are secured by means of additional pillow blocks not shown to the rectangular base 32. Vacuum platen 36 is mounted on one end of a longer shaft 42 and is spaced from platen 35 a distance equal to the width of the all-glass multiple sheet glazing unit to be produced. The shaft 42 is rotatably journaled in suitable bearing on the base 32 and may be turned by a handle or knob 43 for a purpose to be described hereinbelow.

As will best be seen in Fig. 4, each of the platens 35 and 36 is provided with depressions or vacuum cups 44 through which vacuum may be applied to the sheets to hold them against the faces of the respective platens. Grooves 45 which are provided along the face of each of the platens connect the vacuum cups 44 to a centrally disposed opening or bore 46 provided in both the stub shaft 37 and the longer shaft 42. A vacuum or negative pressure area is created in the vacuum cups 44 by means of a vacuum pump 47 (Fig. 6). The vacuum pump 47 is carried on the base portion 32 and is connected by a suitable pipe 48 to a bore in the stub shaft 37 and by pipe 49 to the bore in shaft 42 which connects into pipe 48.

As mentioned above, the carriage 30 rides on the rails 31 to carry the sheets 21 and 22 through the furnace. Movement of the carriage is accomplished by means of a chain drive mechanism 50 to which the carriage 30 may be operably connected by means of a suitable coupling 51.

Turning now specifically to the furnace 27 (Figs. 4 and 6) it is formed generally of a bottom wall 52, side walls 53 and 54, and a roof or ceiling 55 of fire brick or other suitable refractory material. The bottom wall 52 is supported on its corner edges by longitudinally extending beams 56 fastened to support legs 57. For purposes of illustration, heat is supplied to the furnace by Nichrome or other wire filaments 58 fastened to the side walls 53 and 54, however, gas burners or other well known heating techniques may be employed to produce the desired heating effects.

To allow the support rods 41 and the shaft 42 to extend into the interior of the furnace so that platens 35 and 36 may support sheets 21 and 22 and move them past the sealing stations A and B etc., the furnace 27 is provided with a slot (not shown) in the side wall 54, one side of which is defined by a longitudinally extending channel 59 (Fig. 6). This slot allows the platens 35 and 36 to be moved completely through the furnace and past each of the sealing stations A, B, etc., without meeting any obstructions.

Figure 3:
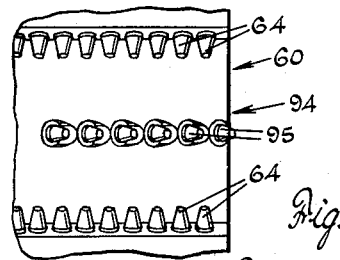
Fig. 3 is a fragmentary plan view of a burner used to heat the marginal edge portions of the glass sheets to the fusing temperature of the glass.

At each of the sealing stations A, B, etc., there are provided sealing elements which include a bending or fusion burner 60 (Figs. 3, 4, and 6), a forming or shaping tool 61 and a finishing burner 62 all mounted on a suitable frame 63 which extends into the furnace. More particularly, the fusing burners 60 (Fig. 6) have angularly disposed side rows of nozzles 64 mounted thereon. The nozzles 64 serve to direct flames 65 in impinging relation upon the edge portions of the glass sheets 21 and 22 as they move therepast to heat the edge portions to the bending temperature thereof.

After a pair of aligned edge portions of the glass sheet are heated to at least the bending temperature of the glass by impinging flames 65 (Fig. 4) coming from the nozzles 64 they are moved into contact with the forming tool 61. As will best be seen in Fig. 7, the forming tool includes forming wheels 66 rotatably mounted on substantially vertical axles 67. Each of the wheels preferably has a lower cylindrical ridge portion 68 which may be moved substantially in contact with one another, while the upper portions of the forming wheels are tapered upwardly and inwardly from the ridge portion and have a dished-out or concave portion as indicated at 69. This dished-out or concave portion is formed to correspond to the desired curvature or shape of the sealed edge on side wall 24 of the multiple sheet glazing unit 20.

Figure 7:
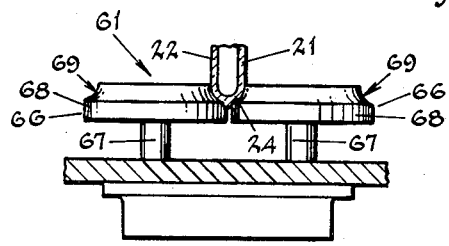
Fig. 7 is a side view of an edge forming tool for forming a multiple sheet glazing unit showing its action on the edge portions of spaced sheets of glass to form a sealed edge of the unit.

Thus as the sheets leave the fusion burner area where the edge portions thereof are heated to at least the bending temperature of the glass, they engage the forming wheels 66 which are free to rotate with the relative movement of the sheets and act to force or bring the edge portions of the respective sheets 21 and 22 into contact with one another as is illustrated in Fig. 7. That is, the softened edge portions of the sheet upon passing through the restricted passageway between the forming wheels are caused to deflect inwardly to a point where they are brought into contact with one another and fused together.

If desired, after the side walls or edges of the all-glass unit have been bent to the desired configuration by the forming tool 61, the marks or scratches that may have been formed by the forming tool may be removed by a fire polishing process. For this purpose, there is provided a finishing or polishing burner 62 having two rows of aligned nozzles 70 which impinge upon the sealed edge of the unit to again heat it slightly thus causing the marks or scratches to blend in an even smooth contour.

As pointed out hereinabove, it has been common practice in the forming of multiple sheet glazing units to place the dehydration or breather holes through the face portions of the glass sheets before they were sealed together. This of course was found to be disadvantageous in some instances because of large amounts of breakage which occurred in drilling the sheets, or because of small fissures or fractures which emanated from the drilled holes and caused the sheets to break upon the application of heat in the sealing of the edge portions together. According to the present invention, to alleviate these conditions, the dehydration or breather hole is formed in the edge wall 24 of the unit immediately after the edge portions of the sheets have been sealed together and while the edge wall is still in at least a semi-soft condition.

To accomplish the forming of the dehydration holes in the sides of the unit, there is provided a hole punching means 71 at station A immediately behind the fire polishing burner 62 which is adapted to form a small hole in one side of the fused wall 24 and to be immediately withdrawn so as not to impede movement of the unit through the furnace. Specifically, the edge punching means includes a base portion 72 in which a punching rod 73 is carried in a suitable bore 74. The punching rod has a pointed end 75 and is provided with a passageway 76 through which air or other suitable gas under pressure may pass to aid in forming the dehydration hole. A guide block 77 having a bore 78 therein is provided to guide the upper end of the punching rod 73 during its movement toward the passing glazing units.

Actuation of the punching rod 73 is accomplished by means of a solenoid 79 which forces the punching rod upwardly toward the sealed edge of the unit so as to penetrate the wall 24. The solenoid is energized when an arm 80 on conveyor carriage 30 engages a switch 81 mounted on the frame 29 adjacent one of the rails 31. Upon penetration of the edge wall 24, the punching rod 73 is immediately urged to its down or normal position indicated by the dotted line position 82 (Fig. 10) by a spring 83 carried in a larger bore 84 in the guide block 77 which abuts a collar 85 on the punching rod and forces it downwardly upon deenergization of the solenoid. The action of the solenoid and the spring its timed to be very fast so that the glazing unit being formed may be moved continuously without any hesitation or pause.

Figure 8:
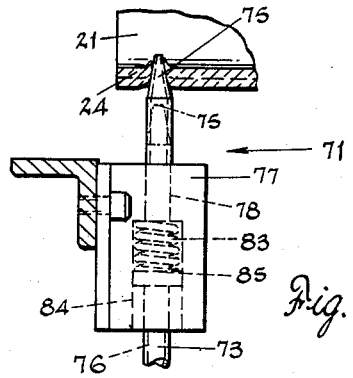
Fig. 8 is a side view of the hole forming apparatus to which this invention is directed.
Figure 9:
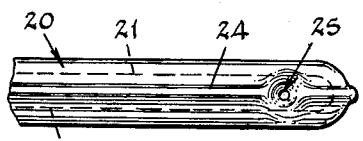
Fig. 9 is a fragmentary plan view of a sealed edge of a multiple sheet glazing unit showing the dehydration or breather hole therein.
Figure 10:
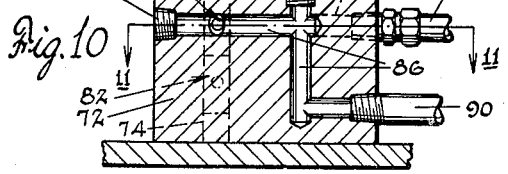
Fig. 10 is a fragmentary sectional view of the actuating means for the hole forming means of the invention.

To aid in forming the hole 25 in the side wall 24 of the unit, as the pointed end 75 of the punching rod 73 makes contact with the side wall, air or gas under pressure is forced through the passageway 76 in the punch rod. The air or gas is brought to the bore in the rod 73 by means of passageways 86 and 87 in the base 72 which communicates with an opening 88 in the lower portion of the rod 73 when the rod is in the up or punching position as indicated in Figs. 8 and 10. More specifically, the passageway 86 has a plug 89 in one end thereof and air or gas is brought to the passageway by a pipe 90. When the punching rod is in its down position as indicated by the dotted line portion 82 in Fig. 10, the opening 88 in the rod 73 is out of registry with the passageway 86 and the flow of air or gas through the opening 88 in the rod is cut off.

Figure 11:
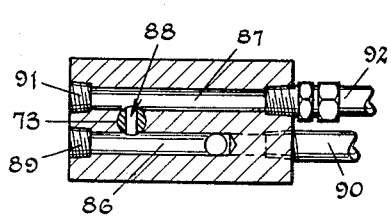
Fig. 11 is a sectional view taken along lines 11—11 of Fig. 10.

When the rod is in the up position as shown in Figs. 10 and 11, the air or gas may pass through the opening 88 in the rod and through the passageway 87 which has a plug 91 in one end thereof, and has a flexible hose 92 connected to the other end. The other end of hose 92 is connected by means of a T-connection 93 to passageway 76 in the punch rod 73. In other words, the air or gas passes from the conduit pipe 90 through the passageway 86 to the openings 88 in the rod 73 to the passageway 87 through the flexible hose 92, and up to the passageway or bore 76 in the punching rod 73. As the punching rod 73 moves downwardly, the air is cut off by the valve action as the opening 88 in the rod moves out of registry with the passageway 86 and 87.

After an edge wall 24 of the unit has been sealed and the dehydration hole 25 formed therein, the unit is rotated 90° as the carriage 30 moves it to sealing station B to place another pair of unsealed edges in position to be sealed. To rotate the glazing unit, the handle 43 on the end of shaft 42 is used to rotate platen 36. Since at this point the sheets 21 and 22 are joined along at least one edge thereof, and since both of the platens 35 and 36 exert vacuum forces upon the glazing unit, the far platen 35 may rotate in its bearing mount 38 with the glazing unit 20 as the platen 36 is rotated.

Figure 5:
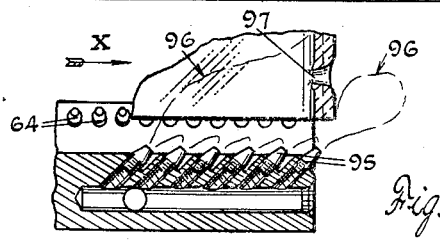
Fig. 5 is a fragmentary sectional view showing the relationship between a fusing burner and the glass sheets as the marginal edge portions of a pair of opposed sides of the sheets are being heated to the fusing temperature and after a dehydration hole has been placed in the sealed edge of one side of the unit.

As the unit begins to enter sealing station B, it passes a fusing burner head 60 which is similar to that shown in station A except that it is provided with a central row of nozzles 94 comprising a plurality of angular disposed individual nozzles 95 located between side rows of nozzles 64. The centrally disposed nozzles 95 (Fig. 5), which are at an angle with respect to the direction of movement x of the sheets 21 and 22, direct flames 96 between the unsealed edges of the sheet which are about to be fused together and upon the inside area, indicated generally at 97, of the dehydration or breather hole 25. By directing the flames of the inside of the newly formed dehydration hole, the inner edges of the hole may be fire polished and any strains or cracks that may have formed along the inside of the edge wall 24 during the formation of the hole will be eliminated.

Upon the fire polishing of the inside of the dehydration hole, the edges of the sheet which were simultaneously heated to at least bending temperature, engage another forming tool 61 which bring the respective edges into fusing contact with one another. Similarly, as in sealing station A, the sealed edge of the unit is then moved past a finishing burner 62 to fire polish the newly formed edge wall 24. After leaving the sealing area B, if all of the respective sides of the unit have been sealed, the conveyor cart 30 and unit 20 are moved to an unloading station, not shown, if not, the unit is again rotated and moved to another sealing station.

It will be apparent that while only two sealing stations have been shown, that generally there will be as many sealing stations as there are sides of the unit to be sealed. For example, if the unit is rectangular, four sealing stations will be provided and the unit will be rotated after each of the respective edges has been sealed to place the remaining aligned unsealed edges of the sheet in position to be sealed. In this connection, it will of course be apparent that the hole punching means 71 may be placed at any of the sealing stations, depending on the number of dehydration or breather holes desired. This being the case, generally a fusion burner of the type indicated at 94 will then be placed at the sealing station following the location of the hole punching means.

Reviewing now this invention by which spaced sheets of glass may have dehydration or breather holes formed in the sealed edge portions during the sealing of the unit, initially the sheets of glass 21 and 22 are supported in position on the conveyor carriage 30 by means of platens 35 and 36. The conveyor carriage then moves the sheets through the respective sealing stations A, B, etc., in the furnace to fuse the edge portions together. As the sheets move through station A, a pair of aligned edge portions are heated to at least bending temperature by fusion burner 60, after which they are moved into engagement with the forming tool 61 to bring the edges into fusing contact with one another, and thence past the finishing burner 62 to remove any surface irregularities.

At this point, after the edge of the unit has been sealed, the arm 80 on the conveyor cart 30 engages the switch 81 (Fig. 6) and actuates the solenoid 79 to cause the punching rod 73 to move upwardly and to pierce the substantially soft sealed edge portions 24 as shown in Fig. 8. When in the up position, the opening 88 in the rod 73 registers with the passageways 86 and 87 in base 72 and allows air or gas to flow through the passageways and through the flexible hose 92 to the passageway 76 in the punching rod 73. This fluid under pressure aids in evenly and neatly piercing the sealed edge. If desired, the holes may be formed without the use of the air or gas pressures. The solenoid 79 is so timed that it is deenergized immediately upon puncturing the sealed edge wall 24 and is immediately returned to the inoperative position by spring 83.

Before moving to the sealing area B, the sheets 21 and 22 are rotated 90° by means of crank handle 43 which rotates the shaft 42 and platens 36 and 35 to place another pair of aligned edges of the sheets in position to be sealed. As the unsealed pair of edges begin to pass the fusion burner 94, the inside of the dehydration hole 25 is subjected to a fire polishing effect by flames 96 emanating from the central row of angularly disposed nozzles 95. After passing the fusion burner head 94, the edges of the sheets are brought into fusing contact with one another by another forming tool 61, and then polished by a finishing burner 62. In this manner, the sheets are sealed around their entire peripheries as they are moved through a plurality of sealing areas of the type indicated by the letters A and B respectively, and any number of dehydration or breather holes may be formed in the sealed edges as described above.

By forming the dehydration or breather holes in the sealed side wall of the glazing unit substantial advantages are obtained. For example, formation of the holes during the fabrication of the units eliminates the necessity and cost of drilling such holes in the glass sheets before they are sealed together. Moreover, losses in breakage caused by defectively drilled holes, or by breakage caused by thermal shock when the edges of the sheets are initially heated during the sealing process is eliminated. Additionally, the placing of the dehydration hole in the side or edge wall portions has the further advantage of placing the seal for the hole which may be formed of a suitable metal or mastic in a position where it is less likely to be broken during installation and subsequent cleaning of the window.

It of course is to be understood that the form of the invention disclosed herein is to be taken as the preferred embodiment thereof and that various changes in the shape, size and arrangement of parts may be resorted to without departing from the spirit of the invention or the scope of the following claims.

We claim:

1. Apparatus for producing multiple sheet glazing units, comprising means for supporting a plurality of sheets in spaced relation with respect to one another, a plurality of means for heating the marginal edge portions of the sheets, means for effecting relative rectilinear movement of said sheets and heating means in the planes of said sheets, the heating means being in proximity to and positioned to direct heat toward the marginal edge portions of said sheets to render them pliable, a plurality of means for bringing the heated edge portions together to form completely fused edge walls, punching means adjacent one of said heating means and disposed forwardly of one of said edge wall forming means, said punching means being movable in a direction normal to one of said sealed edge walls for forming an opening substantially instantaneously in said one sealed edge wall during relative movement of said one edge wall and said heating means, means operably connected with said punching means to actuate the punching means as the edge wall is being formed, and means for subsequently intermittently rotating said sheet supporting means to position successive sides of said sheets in adjacent relation to others of said heating and edge wall forming means.

2. In apparatus for producing multiple sheet glazing units, means for supporting the sheets in spaced relation with respect to one another, a plurality of means for heating the marginal edge portions of the sheets to pliable condition, means for effecting relative rectilinear movement of said sheets and heating means in the planes of said sheets, a plurality of means for pressing said marginal edge portions together to form sealed edge walls of substantially homogeneous construction, said sheet supporting means being operable to bring successive edges of the sheets into close proximity to said heating and pressing means, punching means disposed forwardly of one of said pressing means and adjacent the sheets as one of said edge walls is being formed by said one pressing means, said punching means being movable into said one edge wall to form an opening in said one sealed edge wall, means for subsequently intermittently rotating said sheet supporting means in the planes of said sheets to position successive sides of said sheets in adjacent relation to others of said heating means, and means operable upon said subsequent rotation of said supporting means and positioning of others of said marginal edge portions in adjacent relation to another of said heating means to direct a flame between said last mentioned edge portions before sealing thereof and into said opening to fire polish said opening.

3. In apparatus for producing multiple sheet glazing units, means for supporting the sheets in spaced relation with respect to one another, a plurality of means for heating the marginal edge portions of the sheets to a pliable condition, a plurality of means for pressing the heated edge portions together into complete fusion contact to form sealed edge walls, means for effecting relative rectilinear movement of the heated marginal edge portions and pressing means to progressively seal one edge wall, means adjacent the sealed edge wall disposed forwardly of one of the pressing means for forming an opening in said one sealed edge wall, said opening means comprising a punch having a passageway therethrough to conduct fluid under pressure, valve means for regulating the flow of fluid through said passageway, drive means for moving said punching means in a direction normal to said one sealed edge wall to perforate said one wall while the wall is in pliable condition, and means for subsequently intermittently rotating said sheet supporting means to position successive sides of said sheets in adjacent relation to others of said heating and edge wall forming means.

References Cited in the file of this patent

UNITED STATES PATENTS

| | | |
|---|---|---|
| 2,193,393 | Danner | Mar. 12, 1940 |
| 2,414,587 | Eisler | Jan. 21, 1947 |
| 2,624,978 | Hohmann | Jan. 13, 1953 |
| 2,761,248 | Cowley et al. | Sept. 4, 1956 |

FOREIGN PATENTS

| | | |
|---|---|---|
| 576,248 | Great Britain | Apr. 12, 1946 |